United States Patent
Kanno et al.

(10) Patent No.: US 6,835,230 B2
(45) Date of Patent: Dec. 28, 2004

(54) METHOD FOR LEACHING ZINC CONCENTRATE

(75) Inventors: Manabu Kanno, Akita (JP); Yoshiyuki Watanabe, Akita (JP); Kaoru Saruta, Gojome-cho (JP); Akira Narumi, Minami-Akita-gun (JP)

(73) Assignee: Dowa Mining Co., Ltd., Tokyo (JP)

( * ) Notice: Subject to any disclaimer, the term of this patent is extended or adjusted under 35 U.S.C. 154(b) by 69 days.

(21) Appl. No.: 10/058,438

(22) Filed: Jan. 28, 2002

(65) Prior Publication Data

US 2003/0041692 A1 Mar. 6, 2003

(30) Foreign Application Priority Data

Mar. 28, 2001 (JP) ........................................ 2001-091738
Sep. 13, 2001 (JP) ........................................ 2001-278156

(51) Int. Cl.$^7$ .............................................. C22B 3/08
(52) U.S. Cl. ............................. 75/743; 75/744; 241/20
(58) Field of Search ...................... 75/743, 744; 241/20

(56) References Cited

U.S. PATENT DOCUMENTS

| | | | |
|---|---|---|---|
| 2,435,340 A | 2/1948 | Christensen | |
| 3,867,268 A | 2/1975 | Kawulka et al. | |
| 4,189,461 A | 2/1980 | Leuders et al. | |
| 4,269,808 A * | 5/1981 | Kawabata | 423/1 |
| 4,606,763 A * | 8/1986 | Weir | 75/743 |
| 4,676,828 A | 6/1987 | Andre | |
| 4,828,809 A | 5/1989 | Thomassen et al. | |
| 5,007,589 A * | 4/1991 | Evans et al. | 241/21 |
| 5,120,353 A | 6/1992 | Fugleberg et al. | |
| 5,232,491 A * | 8/1993 | Corrans et al. | 75/743 |
| 5,346,532 A * | 9/1994 | Sinclair et al. | 75/744 |
| 5,380,354 A | 1/1995 | Chalkley et al. | |
| 6,395,063 B1 | 5/2002 | Cole | |
| 6,475,450 B1 * | 11/2002 | Saruta et al. | 423/109 |

FOREIGN PATENT DOCUMENTS

| | | |
|---|---|---|
| EP | 0 451 456 A1 | 10/1991 |
| JP | 6-43619 B2 | 6/1994 |
| JP | 2856933 B2 | 11/1998 |

* cited by examiner

Primary Examiner—Melvyn Andrews
(74) Attorney, Agent, or Firm—Frishauf, Holtz, Goodman & Chick, P.C.

(57) ABSTRACT

A method of leaching zinc from a zinc concentrate comprising leaching a zinc concentrate in an aqueous solution containing free sulfuric acid and ferric ions, whereby elemental sulfur is deposited on the zinc concentrate, and grinding the zinc concentrate under atmospheric pressure in the aqueous solution to provide particles of the zinc concentrate having surfaces, wherein the elemental sulfur and other by-products which form on the surfaces of the particles of the zinc concentrate are stripped by the grinding.

23 Claims, 1 Drawing Sheet

“METHOD FOR LEACHING ZINC CONCENTRATE”

BACKGROUND OF THE INVENTION

This Invention relates generally to a hydrometallurgical zinc production process by which zinc and other valuable metal elements such as lead, gold and silver, as well as the by-product elemental sulfur (which is hereunder referred to simply as "sulfur") are recovered from zinc concentrates which are sulfides containing not only zinc but also other valuable metal elements such as lead, gold and silver. In particular, the invention relates to the step of leaching zinc concentrates in the process.

Known prior art techniques for leaching zinc concentrates and other steps in the hydrometallurgical zinc production process are disclosed in JP No. 2,856,933 and JP 6-43619B. In the method of treating zinc concentrates according to JP No. 2,856,933, the leaching step is carried out in two stages. Prior to leaching, the zinc concentrates are roasted to form calcined zinc (calcines) which are then subjected to neutral leaching. In the next stage, using the spent electrolyte (return acid) from the electrolytic winning step, strong acid leach is effected to dissolve the unleached zinc concentrate and the slightly soluble zinc ferrite which results from the roasting step. The ion of trivalent iron (sometimes called "ferric iron") which is necessary to leach zinc is not fully supplied by the iron that occurs from the decomposition of zinc ferrite, so after the leaching step, the ion of divalent iron (sometimes called "ferrous iron") is recycled after oxidization. As the result of performing this leaching process for 6–10 hours at 90–95° C., a zinc recovery of about 99% can be achieved. The residues from the leaching step are subjected to either a pyrometallurgical treatment in a blast furnace to recover any valuable metals present or flotation to concentrate the valuable metals for subsequent recovery.

In the method described in JP 6-43619B, the step of leaching zinc concentrates consists of at least two stages. After the zinc concentrate is pulverized into fine particles, the first stage of leaching is effected under superatmospheric condition by applying an oxygen pressure at a temperature of 125–160° C. to give a final free sulfuric acid concentration of 20–60 g/L and a ferric ion concentration of 1–5 g/L. This results in incomplete leaching of zinc. The second stage of leaching is effected under atmospheric pressure using an excess amount of the spent electrolyte (return acid) generated in the electrolytic winning step, with oxygen being supplied to give a free sulfuric acid concentration of 60–160 g/L and a ferric ion concentration of 2–3 g/L. This yields a solution of zinc sulfate and a leach residue. Since the residue contains the remaining part of zinc, copper and iron, as well as the greater part of lead and noble metals, flotation is applied to recover these metal values as separate entities.

The prior art methods described above have the advantage that they can be incorporated into the existing circuit of roasting, leaching and electrolytic winning steps in the hydrometallurgical zinc producing process and that the need to reinforce the existing equipment is fairly small. In addition, the percent zinc recovery from the zinc concentrate is fairly high and it is also possible to recover valuable metal elements such as lead and precious metals. However, the prior art methods have their own drawbacks. To implement the method disclosed in JP No. 2,856,933, roasting equipment, sulfuric acid recovering equipment and even equipment for oxidizing the ion of divalent iron have to be added, leading to a higher construction cost; in addition, it takes an unduly long time to achieve complete leaching of zinc into solution. The method disclosed in JP 6-43619B has the following disadvantages: the pulverizing step is necessary; the leaching step involves a multiple of stages; the leaching temperature is so high that the operating cost is increased; the percent zinc leach is not high enough and, what is more, the sulfur which is a by-product forming as the zinc concentrate is leached is melted in the hot leach liquor and the reaction for leaching zinc from the zinc concentrate is inhibited, thereby prolonging the leach time while contributing to a further decrease in the percent zinc leach.

SUMMARY OF THE INVENTION

In order to solve these problems of the prior art, the present inventors conducted intensive studies and found that by grinding and leaching the zinc concentrate either simultaneously or separately, the ingredients that stayed on the surface of the concentrate to interfere with the leaching reaction can be effectively stripped or separated away to achieve a marked improvement in the rate at which zinc is leached.

When oxygen was fed into the piping to pressurize its interior while the leach liquor was being circulated by means of a pump, the iron ion that had been consumed to the divalent form during the reaction was regenerated to the trivalent form which could be put again into the leaching cycle, thereby successfully oxidizing the iron ion without using any large-scale pressure vessel.

The present inventors also attempted the following process: oxygen was supplied in a pressurized atmosphere to oxidize a liquor containing both free sulfuric acid and the divalent iron ion, thereby preparing an iron-containing, acidic solution into which the zinc concentrate was subsequently charged for leaching or, alternatively, the zinc concentrate was directly leached in the pressurized atmosphere, thereby causing the oxidization of the ferrous ion in the liquor and the leaching of the zinc concentrate under superatmospheric pressure to be accomplished in one step; thereafter, the zinc concentrate was leached as it was ground and then it was leached with the iron-containing, acidic solution or subjected to another cycle of oxidizing and leaching steps in the pressurized atmosphere; by means of this approach, both the leach rate and the percent leach were remarkably improved for not only zinc but also other valuable metals such as cadmium and copper in the zinc concentrate.

When a pressure vessel such as an autoclave having oxygen gas inlet ports, a drain port through which the iron-containing, acidic solution or the leached slurry was to be discharged, and any other necessary ports provided at specified sites of the vessel was used to implement the above-described leaching method under superatmospheric pressure with oxygen gas being supplied through the oxygen gas inlet ports, the rate of reaction for the oxidation of the ferrous ion was sufficiently increased that not only the rate of the reaction for the leaching of the zinc concentrate but also the percent leach could be improved to realize a substantial reduction in the scale and the cost of the leaching equipment.

DETAILED DESCRIPTION OF THE INVENTION

Figure 1:
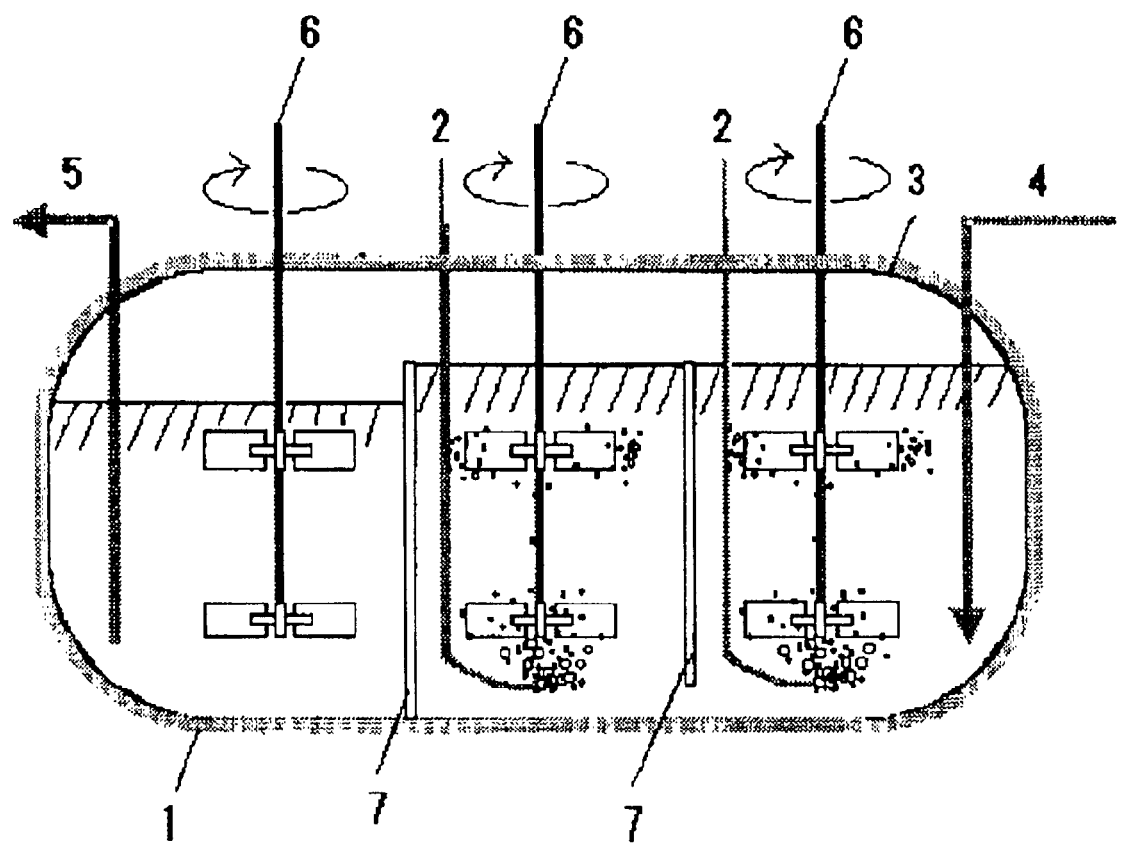
FIG. 1 is a schematic cross section of a leaching apparatus used to oxidize the solution containing free sulfuric acid and ferrous ions and leach the zinc concentrate, wherein reference numeral 1 designates a pressure vessel, 2 an oxygen blow pipe, 3 a titanium lining, 4 a charge pipe, 5 a discharge pipe, 6 a stirrer, and 7 a partition.

The present invention provides the following methods according to its first aspect:
1. A method of leaching zinc from a zinc concentrate by grinding the zinc concentrate in an aqueous solution containing free sulfuric acid and ferric ions.
2. The method according to item 1, wherein said grinding is effected at atmospheric pressure.
3. The method according to item 1 or 2, wherein any by-product that forms on the surfaces of the particles of said zinc concentrate as the result of said leaching is stripped by said grinding in order to shorten the time of said leaching.
4. The method according to any one of items 1–3, wherein oxygen is supplied into the post-leach solution containing the ferrous ions that result from the reduction of said ferric ions during said leaching, whereby said ferrous ions are oxidized to ferric ions and the solution containing said ferric ions is returned to said grinding step.
5. The method according to any one of items 1–3, wherein oxygen is supplied into a pipe through which said aqueous solution is transferred to said grinding step, whereby the interior of said pipe is pressurized.
6. The method according to item 4, wherein oxygen is supplied into a pipe through which said post-leach solution is returned to said grinding step, whereby the interior of said pipe is pressurized.
7. The method according to any one of items 1–6, wherein the concentration of free sulfuric acid that is present in said aqueous solution at the end of the leaching is controlled to be no less than 40 g/L, thereby preventing the formation of jarosite.
8. The method according to any of items 1–7, wherein the concentration of ferric ions in said aqueous solution is controlled to lie within the range of 5–60 g/L.
9. The method according to any one of items 1–8, wherein the residue remaining after said leaching in which at least one metal element in said zinc concentrate that is selected from among lead, gold and silver is concentrated is subjected to flotation to recover said at least one metal element.
10. The method according to item 9, in which the float obtained by said flotation is heated to a temperature not lower than the melting point of sulfur, whereby the elemental sulfur in said float is evaporated and recovered.

These methods according to the first aspect of the invention are specifically implemented as described below.

Using both the spent electrolyte (return acid) with a free sulfuric acid concentration of about 150–200 g/L that results from the electrolytic winning stage and the post-treatment solution that no longer contains iron, temperature is raised to 80–95° C. for initiating the zinc leaching reaction. The reaction involved is expressed by the following equation:

$$ZnS+Fe_2(SO_4)_3 \rightarrow ZnSO_4+2FeSO_4+S \ldots \quad (A)$$

The trivalent iron necessary for promoting the reaction (A) is supplied from the iron in the zinc concentrate to be treated. During leaching, the concentration of the ferric ion is preferably adjusted within the range of 5–60 g/L, more preferably in the range of 5–15 g/L. If the concentration of the ferric ion is below 5 g/L, the reaction (A) does not proceed at a satisfactorily high rate; on the other hand, the effect of the ferric ion is saturated if its concentration exceeds 60 g/L.

The reaction (A) progresses with the passage of time; on the other hand, elemental sulfur and other by-products of the reaction are deposited on the surfaces of the particles of the zinc concentrate to reduce the surface areas available for the required reaction and, as a consequence, the reaction rate decreases in the subsequent period and considerable time is required to leach all zinc that is contained.

In methods 1–10 of the invention, the zinc concentrate is leached as it is ground by means of a grinding machine such as a ball mill in order to strip or separate the elemental sulfur and other by-products of the reaction (A) from the surfaces of the particles in the concentrate. If desired, the grinding step may be performed separately from the leaching step. After being leached once, the zinc concentrate is ground to strip or separate the by-products from the surfaces of the particles and then a second leach is performed, followed by another grinding operation; thus, the grinding and leaching steps may alternate in a repeated manner to attain the intended object of the invention. The grinding machine to be used in the grinding operation is not limited to a ball mill and any type of machine can be used as long as it fits the purpose of stripping or separating the elemental sulfur and other by-products from the surfaces of the particles in the zinc concentrate. Other grinding machines that can be used include a rod mill, a tower mill, a vibrating mill, and an attrition mill. The grinding also contributes to further refining the zinc concentrate and its specific surface area is sufficiently increased to promote the leaching process. The particle size of the zinc concentrate to be ground is not limited to any particular value; however, for shorter leach times, smaller particle sizes are desirable, as exemplified by a median size of 1–100 $\mu$m and a 90% particle size of 50–1,000 $\mu$m. Particles with median sizes finer than 1 $\mu$m are most likely to scatter in the process of ore transfer, causing a lower yield of the raw material. If the median size is greater than 100 $\mu$m, the intended effect of the grinding operation is not attained.

In the grinding process, the slurry should have higher concentrations, preferably at least 30 g/L.

As the result of the leaching reaction, a leach residue occurs but depending on the leaching conditions, lead jarosite may also be formed. The presence of such lead jarosite increases the amount of the leach residue to be formed, hence, the cost of the residue treatment. In order to suppress the formation of jarosite during the leaching reaction, the concentration of free sulfuric acid present at the end of the leaching need be controlled at 40 g/L and more.

As is evident from the equation (A), the progress of the leaching of the zinc concentrate is accompanied by the consumption of the ferric ion required to sustain the leaching process. If the ferric ion is lost, the leaching reaction (A) no longer proceeds but simply stops. In order to prevent this trouble, the ferric ion is kept supplied in an amount corresponding to the level of zinc in the zinc concentrate or, alternatively, the evolved ferrous ion is oxidized to regenerate the ferric ion so that it is recycled to the leaching circuit. This oxidation reaction is represented by the following equation (B):

$$2FeSO_4+\tfrac{1}{2}O_2+H_2SO_4 \rightarrow Fe_2(SO_4)_3+H_2O \ldots \quad (B)$$

Under atmospheric pressure, this reaction for oxidation of the ferrous ion proceeds at very slow rate. A common practice is creating a superatmospheric condition in a pressure vessel such as an autoclave and performing the oxidation reaction at an accelerated rate. However, pressure vessels such as an autoclave are not only difficult to handle but also expensive. In the present invention, a pressurized state is created within pipes and as the solution flows through the pipes, the ferrous ion is oxidized to regenerate the ferric ion which is then returned for further use in the leach step.

If the leaching of the zinc concentrate and the oxidizing of the ferrous ion are performed in successive stages, about 95% of the zinc content in the zinc concentrate can be leached in about 30 minutes which is considerably shorter than the reaction time of the conventional methods. While this effect is attained by grinding the zinc concentrate in the leaching aqueous solution, it should be remembered that alternating the grinding and leaching steps is also effective.

The leachate from the leaching step passes through the purification step to be transferred to the electrolytic winning step, in which zinc is recovered from the leachate as electrolytic zinc. The leach residue contains lead, silver, elemental sulfur and precious metals other than silver and these must be separated out. To this end, the leach residue is sent to the flotation step so that sulfides and elemental sulfur are separated from the metal fraction. Stated more specifically, solid-liquid separation is performed after the leaching step to make a concentrated slurry of the leach residue which is subjected to flotation with air being blown into the slurry as it remains liquid. This process causes sulfur and sulfides to be transferred to the float whereas lead, silicates and precious metals are transferred to the tailings.

The elemental sulfur in the float is evaporated at a temperature higher than its melting point and the resulting vapor of sulfur is cooled to condense in a recoverable form. The lead and precious metals contained in the tailings are recovered by a pyrometallurgical treatment.

According to its second aspect, the present invention provides the following methods:

11. A method of leaching zinc concentrates which comprises the pressurized oxidation step of oxidizing a solution containing free sulfuric acid and iron ions in a pressurized oxidizing atmosphere to prepare an iron-containing, acidic solution and the grinding and leaching step of leaching zinc from a zinc concentrate as the latter is ground in said iron-containing, acidic solution.
12. A method of leaching zinc concentrates which comprises the pressurized oxidation and leaching step of oxidizing a solution containing free sulfuric acid and iron ions in a pressurized oxidizing atmosphere to prepare an iron-containing, acidic solution which is used to leach zinc from a zinc concentrate and the grinding and leaching step of leaching zinc from the resulting slurry as the latter is ground.
13. A method of leaching zinc concentrates which comprises the pressurized oxidation step of oxidizing a solution containing free sulfuric acid and iron ions in a pressurized oxidizing atmosphere to prepare an iron-containing, acidic solution, the leaching step of leaching zinc from a zinc concentrate by means of said iron-containing, acidic solution, and the grinding and leaching step of leaching zinc from the resulting slurry as the latter is ground.
14. The method according to item 11 or 13, which further includes an additional grinding and leaching step in which zinc is leached from the slurry resulting from the first grinding and leaching step as the latter is ground in said iron-containing, acidic solution.
15. The method according to item 12, which further includes an additional pressurized oxidation and leaching step in which the slurry from the first grinding and leaching step in the pressurized oxidizing atmosphere is oxidized to regenerate an iron-containing, acidic solution which is used to leach zinc from said slurry.
16. The method according to item 15, which further includes an additional grinding and leaching step in which zinc is leached from the slurry resulting from said additional pressurized oxidation and leaching step as the latter is ground.
17. The method according to item 11, 13 or 14, wherein said pressurized oxidation is performed at a solution's temperature of 90° C. or higher.
18. The method according to item 12, 15 or 16, wherein said pressurized oxidation and leaching step and said additional pressurized oxidation and leaching step are performed at a solution's temperature of 90–120° C.
19. The method according to any one of items 11–18, wherein the concentration of free sulfuric acid present in the slurry at the end of said leaching is 2 g/L or more.
20. The method according to any one of items 11–19, wherein the concentration of ferric ions in said iron-containing, acidic solution is 2 g/L or more.

According to its third aspect, the present invention provides the following apparatus:

21. An apparatus for leaching zinc concentrates which comprises a pressure vessel to be charged with a solution containing at least free sulfuric acid and iron ions, oxygen gas supply pipes that extend into said vessel from the outside and which have oxygen gas inlet ports open below stirrers, and a pipe through which an iron-containing, acidic solution or a slurry that results from the reaction of said solution containing at least free sulfuric acid and iron ions is discharged to the outside has a drain port open in the lower part of said vessel.

Methods 11–20 according to the second aspect of the invention and apparatus 21 according to its third aspect are operated in the following manner.

A solution containing free sulfuric acid and iron ions that has been prepared using primarily the spent electrolyte (return acid) from the zinc electrolytic winning step which has preferably a free sulfuric acid concentration of 150–200 g/L and the zinc solution that is formed by removing iron is oxidized in a pressurized atmosphere at an elevated temperature which is preferably at least 90° C., more preferably in the range of 90–120° C., to make an iron-containing, acidic solution. The iron-containing, acidic solution is used in the subsequent step of leaching the zinc concentrate in a pressurized atmosphere or an air atmosphere. The rate of iron ion oxidation can be increased by elevating the temperature of the iron-containing, acidic solution in a pressurized atmosphere to 90° C. or higher. If both oxidation of the iron-containing, acidic solution and leaching of the zinc concentrate are to be performed in the pressurized atmosphere, the temperature of the solution may be elevated to 90–120° C. and this contributes not only to increasing the rate of iron ion oxidation but also to preventing the melting of sulfur which is a by-product of the leaching of the zinc concentrate; as a result, both the percent leach of zinc from the zinc concentrate and the rate of its leach can be improved. Another advantage of selecting a leach temperature in the range of 90–120° C. is that there will be no re-precipitation of Fe and Cu in the solution and the percent recovery of these metals can be increased while shortening the reaction time. As already mentioned, the reaction involved in the leaching of zinc concentrates is expressed by the following equation:

$$ZnS + Fe_2(SO_4)_3 \rightarrow ZnSO_4 + 2FeSO_4 + S \ldots \qquad (A)$$

The trivalent iron necessary for promoting the reaction (A) is supplied from the iron in the zinc concentrate to be treated. During leaching, the concentration of ferric ions in the iron-containing, acidic solution is adjusted to 2 g/L and above, preferably in the range of 2–60 g/L, more preferably in the range of 2–15 g/L. If the concentration of ferric ions is below 2 g/L, the reaction (A) does not proceed at a satisfactorily high rate; on the other hand, if the concentration of the ferric ion exceeds 60 g/L, the oxidizing effect is saturated and no commercial feasibility is realized. Copper, cadmium and other valuable metals in the zinc concentrate are leached in the same way as zinc is.

The reaction (A) progresses with the passage of time; if the zinc concentrate is leached at a solution's temperature of 120° C. or below, the sulfur which forms as a by-product of the leaching reaction does not melt but it is deposited to some extent on the surfaces of the particles of the yet to be leached zinc concentrate to reduce the surface areas available for the required reaction and, as a consequence, the leaching reaction rate decreases in the subsequent period and considerable time is required to leach all zinc that is contained in the zinc concentrate.

In order to solve this problem, it is necessary to detach or separate the sulfur that has formed as a by-product of the reaction (A) and which has been deposited on the surfaces of the particles in the zinc concentrate. To this end, the slurry resulting from the step of leaching the zinc concentrate is ground by means of a grinding machine such as a ball mill. The grinding machine to be used in the grinding operation is not limited to a ball mill and any type of machine can be used as long as it fits the purpose of detaching or separating the sulfur from the surfaces of the particles in the zinc concentrate. Other grinding machines that can be used include a rod mill, a tower mill, a vibrating mill and an attrition mill. The grinding also contributes to further refining the zinc concentrate and its specific surface area is sufficiently increased to promote the leaching of the slurry from the grinding step. The particle sizes of the zinc concentrate to be ground and the slurry from the grinding step are not limited to any particular values; however, for shorter leach times, smaller particle sizes are desirable, as exemplified by a median size of 1–100 μm and a 90% particle size of 50–1,000 μm. Particles with median sizes finer than 1 μm are most likely to scatter in the process of transferring the zinc concentrate, causing a lower yield of the raw material. If the median size is greater than 100 μm, the intended effect of the leaching operation is not attained.

As the result of the leaching reaction, a leach residue occurs but depending on the leaching conditions, lead jarosite may also be formed. The presence of such lead jarosite increases the amount of the leach residue to be formed, hence, the cost of the residue treatment. In order to suppress the formation of jarosite during the leaching reaction, the concentration of free sulfuric acid present at the end of the leaching need be controlled at 2 g/L and more, preferably at 40 g/L and more.

As is evident from the equation (A), the progress of the leaching of the zinc concentrate is accompanied by the consumption of the ferric ion required to sustain the leaching process. If the ferric ion is lost, the leaching reaction (A) no longer proceeds but simply stops. In order to prevent this trouble, the ferric ion is kept supplied in an amount corresponding to the level of zinc in the zinc concentrate or, alternatively, the evolved ferrous ion is oxidized to regenerate the ferric ion so that it is recycled to the leaching circuit. As already mentioned, this oxidation reaction is represented by the following equation (B):

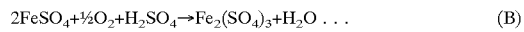

$$2FeSO_4 + \tfrac{1}{2}O_2 + H_2SO_4 \rightarrow Fe_2(SO_4)_3 + H_2O \ldots \quad (B)$$

This reaction for oxidation of the ferrous ion can be carried out under atmospheric pressure but the reaction rate is very slow. In the present invention, the iron-containing, acidic solution is prepared by oxidizing the solution that contains free sulfuric acid and iron ions in a pressurized oxidizing atmosphere. The invention is also characterized in that depending on the case, the reaction of oxidizing the solution and the reaction of leaching the zinc concentrate may be performed in one step in a pressurized oxidizing atmosphere.

Stated more specifically, a pressurized atmosphere created in a pressure vessel such as an autoclave is supplied with an oxidizer such as oxygen in order to raise the concentration of dissolved oxygen in the solution containing free sulfuric acid and ferrous ions, whereby the ferrous ion is oxidized to the ferric ion to prepare an iron-containing, acidic solution; if desired, the same pressurized atmosphere may further be used to leach zinc from the zinc concentrate under superatmospheric condition by means of the iron-containing, acidic solution. Alternatively, zinc may be leached from the zinc concentrate by means of the iron-containing, acidic solution under atmospheric condition. Blowing of oxygen gas is a typical means of oxidizing the ferrous ion in the solution in the pressure vessel but oxygen may be supplied by adding other oxidizers.

FIG. 1 shows a preferred example of the apparatus according to the third aspect of the invention, in which oxidation of the solution containing free sulfuric acid and iron ions and leaching of the zinc concentrate by means of the resulting iron-containing, acidic solution are performed in one step in the pressure vessel. The pressure vessel indicated by 1 is preferably lined with a titanium layer 3 in order to make it acid resistant and to prevent deterioration with oxygen gas. Oxygen gas is used as the oxidizer and it has preferably a purity of at least 99.5%. Oxygen gas is introduced into the solution through oxygen blow pipes 2. If the inlet ports of these pipes 2 are open under stirrers 6, the oxygen gas blown into the solution is dispersed and comminuted into finer sizes by the rotating action of the stirrers 6 and, in addition, gas-liquid contact is enhanced to increase the efficiency of oxidation of the ferrous ion in the solution. The amount of oxygen supply is controlled such that the oxygen partial pressure in the atmosphere in the pressure vessel 1 is held constant within the range of 0.7–1.0 MPa. Controlling the amount of oxygen supply contributes to controlling the oxidation and leaching rates. If the oxygen partial pressure is 0.7 MPa or higher, the rate of oxidizing the ferrous ion is increased. In order to assure the corrosion resistance of the pressure vessel 1 and other equipment, the oxygen partial pressure is preferably no higher than 1.0 MPa. The diameter of the oxygen blow pipes 2 depends on the amount of oxygen gas to be supplied but in order to ensure that finer bubbles of oxygen gas will evolve in the solution, smaller diameters are preferred.

As shown in FIG. 1, partitions 7 are desirably provided within the pressure vessel 1 to ensure that the slurry will flow in the vessel as the reaction progresses. Alternatively, the solution may be conducted through a plurality of separate vessels by a suitable means such as a pump. Stirrers 6 are provided in the respective compartments defined by partitions 7. The blades of stirrers 6 are preferably of a turbine type. With turbine blades, the oxygen gas blown in through the inlet ports of oxygen supply pipes 2 is diffused into finer bubbles and in the radial direction of the turbine blades. As a result, none of the oxygen gas supplied will be stagnant in the vessel 1 and the rate of the reaction for the oxidation of ferrous ions in the solution is increased. This improvement in the oxidation rate allows for the provision of baffle plates on the inner surfaces of the pressure vessel 1.

Since the interior of the pressure vessel 1 is divided into compartments by the partitions 7, the slurry of the zinc concentrate and the solution containing free sulfuric acid and ferrous ions will be transferred from one compartment to the next. Preferably, a charge pipe 4 is positioned such that the inlet port is open in the lower part of the first compartment, into which the slurry is charged to oxidize the ferrous ion and leach the zinc concentrate in the pressurized oxidizing atmosphere; the slurry is preferably transferred to the next compartment after it has undergone the necessary reactions in the first compartment. The part of the slurry which has not been fully leached in the first compartment has high specific gravity since it contains a large amount of the unreacted zinc concentrate; hence, the slurry is better withdrawn from the lower part of the vessel 1 in order to achieve efficient leaching in the next leaching compartment. Withdrawing the slurry from the liquid surface of the solution is by no means efficient since oxygen blowing has caused many bubbles to form on the liquid surface. The slurry that has undergone oxidation and leaching in all compartments is drained to the outside of the vessel through a discharge pipe 5 whose drain port is open in the lower part of the last compartment. The slurry is then subjected to grinding. The slurry obtained by the sequence of pressurized oxidizing/leaching and grinding/leaching steps in the pressure vessel 1 may, depending on the need, be charged again into the vessel 1 and subjected to an additional pressurized oxidizing/leaching step in a pressurized oxidizing atmosphere. Thus, by repeating the steps of oxidation and leaching in the pressure vessel, with the grinding/leaching step inserted between successive oxidation/leaching steps, not only the rate of leaching the zinc concentrate but also the percent leach can be improved significantly.

The leachate from the step of leaching zinc from the zinc concentrate passes through the purification step to be transferred to the electrolytic winning step, in which zinc is recovered from the leachate as electrolytic zinc. The leach residue contains lead, gold, silver and other valuable metals, as well as sulfur and these must be separated out. To this end, the leach residue is sent to the flotation step so that sulfides and sulfur are separated from the metal fraction. Stated more specifically, solid-liquid separation is performed after the leaching step to make a concentrated slurry of the leach residue which is subjected to flotation with air being blown into the slurry as it remains liquid. This process causes sulfur and sulfides to be transferred to the float whereas lead, silicates, gold and silver are transferred to the tailings.

The sulfur in the float is evaporated at a temperature higher than its melting point and the resulting vapor of sulfur is cooled to condense in a recoverable form. The lead, gold and silver contained in the tailings are recovered by a pyrometallurgical treatment.

If it is only oxidation of the ferrous ion in the solution that is to be performed in the pressurized oxidizing atmosphere, only the solution containing free sulfuric acid and ferrous ions may of course be charged into the pressure vessel 1 through the charge pipe 4 and oxidized in that vessel to make an iron-containing, acidic solution, which is eventually drained to the outside of the vessel 1 via the discharge pipe 5 so that the zinc in the zinc concentrate is leached or both ground and leached in air atmosphere.

The following examples are provided for further illustrating the present invention but they are by no means intended to limit the technical scope of the invention.

EXAMPLES

The invention as it relates to methods 1–10 is illustrated below by Examples 1 and 2.

Example 1

A commercial test grinding machine of an attrition mill type, called ATTRITOR (trade name), was used as a grinding machine. The ATTRITOR had a capacity of 5.4 L (200 mm$^\Phi$×176 mm$^H$); it was made of SUS 304; the motor was operating at 170 rpm and faster; the grinding media were alumina balls (9 mm$^\Phi$; charged in about 3 kg).

An aqueous leaching solution was prepared by adjusting the zinc concentration to 100 g/L, the ferric ion concentration to 30 g/L and the free sulfuric acid concentration to 40 g/L.

The zinc concentrate to be treated had the composition shown in Table 1. Metal elements such as Zn, Fe, Pb, Cd and Cu were contained as sulfides in the zinc concentrate. The zinc concentrate had a median diameter of 25 μm and a 90% particle size of 70 μm.

TABLE 1

| Metal element | Zn | Fe | Pb | Cd | Cu |
| --- | --- | --- | --- | --- | --- |
| Content (wt %) | 53.67 | 4.80 | 1.26 | 0.26 | 1.51 |

Two liters (2.0 L) of the aqueous leaching solution was fed into the grinding machine and heated to 90° C. Sixty grams (60 g) of the zinc concentrate was then added to the heated aqueous leaching solution and the grinding machine was run to start grinding and leaching operations. With the slurry being sampled at intervals of 5 minutes, the grinding machine was continuously run for 30 minutes to have the zinc concentrate react with the aqueous leaching solution in it. The collected samples were filtered and the cake (residue) was washed thoroughly with water and the contents of the individual metals in the residue were compared with the initial contents to determine the percent zinc leach.

The results are shown in Table 2, from which one can confirm that 95% zinc leach was accomplished by only 30-minute leaching.

TABLE 2

| Time (min) | Percent zinc leach |
| --- | --- |
| 5 | 40.8 |
| 15 | 46.6 |
| 20 | 70.2 |
| 25 | 92.7 |
| 30 | 95.1 |

Example 2

A grinding and leaching test was conducted as follows using the ATTRITOR (see Example 1). A mother liquor was prepared that had a zinc concentration of 100 g/L, a ferric ion concentration of 15 g/L and a free sulfuric acid concentration of 40 g/L; a zinc concentrate of the same composition as used in Example 1 was added to this mother liquor at a concentration of 30 g/L and leaching was performed for 10 minutes. After the leaching, the slurry was adjusted to have a concentration of 200 g/L and ground with the ATTRITOR for 1 minute. After the grinding, the slurry was filtered and the residue was recovered. These steps comprise one test run. Thereafter, the residue was put back into the mother liquor and subjected to another test run. The number of test runs conducted and the percent leach in each run are shown in Table 3 below.

TABLE 3

| Test run | Percent zinc leach |
|---|---|
| First | 72.7 |
| Second | 89.5 |
| Third (consisting of only 10-min leach) | 96.5 |

Thus, 96.5% zinc leach was achieved by conducting two test runs, followed by 10-min leach. Inclusive of the grinding time, the total processing time was only about 32 minutes and high percent zinc leach could be realized in as short a time period as in Example 1.

In methods 1–10 according to the first aspect of the invention, zinc concentrates were leached with a grinding machine such as a ball mill as elemental sulfur and other by-products were detached and separated from the surfaces of the particles in the zinc concentrates; the leach time was only about 30 minutes which was less than a tenth of the heretofore required 6–10 hours. The ferric ion that was consumed by leaching could be regenerated by introducing oxygen into the piping and this eliminated the need of providing a pressure vessel such as an autoclave. Since the overall leach time was considerably shorter than required in the prior art and there was no need to provide oxidizing equipment, methods 1–10 could be combined to realize substantial cuts in construction and operating costs. As another advantage, these methods can be incorporated into the existing facilities, enabling more zinc to be produced by small addition of equipment.

Described below is Example 3 which relates to methods 1–20 according to the second aspect of the invention, as well as apparatus 21 according to its third aspect.

Example 3

A ball mill was used as a grinding machine. The ball mill had a capacity of 4.5 L (64 mm$^\Phi$×350 mm$^H$); it was made of SUS 316; the motor was operating at 55 rpm; the grinding media were alumina balls (9 mm$^\Phi$, charged in about 9.5 kg).

An iron-containing, acidic solution was prepared by adjusting the zinc concentration to 110 g/L, the ferrous ion concentration to 15 g/L and the free sulfuric acid concentration to 96 g/L.

The zinc concentrate to be treated had the composition shown in Table 4. Metal elements such as Zn, Fe, Pb, Cd and Cu were contained as sulfides in the zinc concentrate. The zinc concentrate had a median diameter of 25 $\mu$m and a 90% particle size of 70 $\mu$m.

TABLE 4

| Metal elements | Zn | Fe | Pb | Cd | Cu |
|---|---|---|---|---|---|
| Content (wt %) | 51.17 | 4.89 | 2.77 | 0.29 | 0.30 |

This zinc concentrate (280 g) and the iron-containing, acidic solution (4.0 L) were fed into an autoclave having an internal capacity of 5 L and heated to 95° C. Thereafter, oxygen was blown directly into the autoclave to build up a partial oxygen pressure of 0.8 MPa, whereupon the oxidizing and leaching reaction started. Twenty minutes later, the autoclave was depressurized and the slurry was taken out it. The slurry was ground in the ball mill (for one pass over 5 minutes), turned back into the autoclave and subjected to another oxidizing and leaching reaction for 10 minutes in the same pressurized oxidizing atmosphere as created above. After this reaction, the autoclave was depressurized and the slurry was taken out of it and ground again in the ball mill (for another pass over 5 minutes); after the grinding, the slurry was turned back into the autoclave and subjected to yet another oxidizing and leaching reaction for 10 minutes in the same pressurized oxidizing atmosphere. After each of the leaching reactions in the pressurized atmosphere, a sample of the slurry was taken and filtered; the cake (residue) was washed thoroughly with water and the contents of the individual metals were measured. The percent zinc leach was determined from the amounts of the initial zinc concentrate and the residue, as well as the contents of their constituent metals.

The results are shown in Table 5, from which one can verify that more than 98% zinc leach was possible by leaching for a total period of only 40 minutes.

TABLE 5

| Cumulative pressurized leach time (min) | Cumulative percent zinc leach (%) |
|---|---|
| 20 | 60.4 |
| 30 | 90.0 |
| 40 | 98.1 |

TABLE 6

| Metal element | Zn | Fe | Pb | Cd | Cu |
|---|---|---|---|---|---|
| Content (wt %) | 2.55 | 4.16 | 6.80 | 0.01 | 0.12 |

Using apparatus 21 to implement methods 11–20, one can improve the rate of oxidation of ferrous ions in an iron-containing, acidic solution by supplying oxygen into a pressurized atmosphere; in addition, the pressurized oxidation of the solution and the pressurized leaching of a zinc concentrate can be performed in one step, thereby shortening the leach time and streamlining the facilities to achieve substantial reduction in the overall cost.

Further according to the second and third aspects of the invention, the slurry from the leaching step was subjected to the grinding step with a grinding machine such as a ball mill to strip the elemental sulfur forming on the surfaces of the particles in the leached zinc concentrate and thereafter the slurry was subjected to the same leaching step; the leach time which was conventionally 6–10 hours could be reduced to less than a tenth. Thus, the overall reaction time was considerably shorter than required in the prior art and substantial cuts in construction and operating costs were realized. As another advantage, methods 11–20 and apparatus 21 can be incorporated into the existing zinc refining process, enabling more zinc to be produced by small addition of equipment.

What is claimed is:

1. A method of leaching zinc from a zinc concentrate comprising leaching a zinc concentrate in an aqueous solution containing free sulfuric acid and ferric ions, whereby elemental sulfur is deposited on the zinc concentrate, and grinding the zinc concentrate under atmospheric pressure in said aqueous solution to provide particles of the zinc concentrate having surfaces, wherein the elemental sulfur and other by-products which form on the surfaces of the particles of the zinc concentrate are stripped by said grinding.

2. The method according to claim 1, which further comprises supplying oxygen into a post-leach solution containing ferrous ions that result from the reduction of said ferric ions during said leaching, whereby said ferrous ions are oxidized to ferric ions and a solution containing said ferric ions is returned to said grinding.

3. The method according to claim 1, which further comprises supplying oxygen into a pipe through which said aqueous solution is transferred to said grinding, whereby the interior of said pipe is pressurized.

4. The method according to claim 2, which further comprises supplying oxygen into a pipe through which said post-leach solution is returned to said grinding, whereby the interior of said pipe is pressurized.

5. The method according to claim 1, wherein the free sulfuric acid that is present in said aqueous solution at the end of the leaching is in a concentration which is controlled to be no less than 40 g/L, thereby preventing the formation of jarosite.

6. The method according to claim 1, wherein the ferric ions in said aqueous solution is in a concentration which is controlled to lie within the range of 5–60 g/L.

7. The method according to claim 1, wherein a residue remains after said leaching which contains at east one metal element in said zinc concentrate that is selected from the group consisting of lead, gold and silver, the residue is concentrated and is subjected to flotation to recover said at least one metal element.

8. The method according to claim 7, in which the float obtained by said flotation is heated to a temperature not lower than the melting point of sulfur, whereby the elemental sulfur in said float is evaporated and recovered.

9. A method of leaching zinc from a zinc concentrate which comprises (a) carrying out a pressurized oxidation step for oxidizing a ferrous ion-containing solution containing free sulfuric acid and ferrous ions in a pressurized oxidizing atmosphere to prepare a ferric ion-containing acidic solution and (b) carrying out a first grinding and leaching step for leaching zinc from a zinc concentrate as the zinc concentrate is ground in said ferric ion-containing acidic solution, whereby elemental sulfur is deposited zinc concentrate by the leaching, to provide particles of the zinc concentrate having surfaces, wherein the elemental sulfur and other by-products which form on the surfaces of the particles of the zinc concentrate are stripped by said grinding.

10. A method of leaching zinc from a zinc concentrate which comprises (a) carrying out a pressurized oxidation and leaching step for oxidizing a ferrous ion-containing solution containing free sulfuric acid and ferrous ions in a pressurized oxidizing atmosphere at a temperature of 120° C. or below to prepare a ferric ion-containing acidic solution and (b) carrying out a first grinding and leaching step, whereby elemental sulfur is deposited on the zinc concentrate, for leaching zinc from the resulting slurry and for grinding the zinc concentrate to provide particles of the zinc concentrate having surfaces, wherein the elemental sulfur and other by-products which form on the surfaces of the particles of the zinc concentrate are stripped.

11. A method of leaching zinc from a zinc concentrate which comprises (a) carrying out a pressurized oxidation step for oxidizing a ferrous ion-containing solution containing free sulfuric acid and ferrous ions in a pressurized oxidizing atmosphere to prepare a ferric ion-containing acidic solution, (b) carrying out a leaching step for leaching zinc from a zinc concentrate in the ferric ion-containing acidic solution, whereby elemental sulfur is deposited on the zinc concentrate and (c) carrying out a grinding and leaching step for leaching zinc from the resulting slurry as the slurry is ground to provide particles of the zinc concentrate having surfaces, wherein the elemental sulfur and other by-products which form on the surfaces of the particles of the zinc concentrate are stripped.

12. The method according to claim 9 or 11, which further includes an additional grinding and leaching step in which zinc is leached from a slurry resulting from the first grinding and leaching step as the slurry is ground in said iron ferric ion-containing acidic solution.

13. The method according to claim 10, which further includes an additional pressurized oxidation and leaching step in which the slurry from the first grinding and leaching step in the pressurized oxidizing atmosphere is oxidized to regenerate an iron-containing acidic solution which is used to leach zinc from said slurry.

14. The method according to claim 13, which further includes an additional grinding and leaching step in which zinc is leached from a slurry resulting from said additional pressurized oxidation and leaching step as the slurry is ground.

15. The method according to claim 9 or 11, wherein said pressurized oxidizing is performed at a temperature of 90° C. or higher.

16. The method according to claim 10, 13 or 14, wherein said pressurized oxidizing and leaching step and said additional pressurized oxidation and leaching step are performed at a temperature of 90 to 120° C.

17. The method according to any one of claims 9 to 11, wherein the free sulfuric acid present in the slurry at the end of said leaching is in a concentration of 2 g/L or more.

18. The method according to any one of claims 9 to 11, wherein the ferric ions in said ferric ion-containing acidic solution is in a concentration of 2 g/L or more.

19. The method according to claim 1 wherein the ferric ions in said aqueous solution are in a concentration of 5 to 15 g/L.

20. The method according to claim 1, wherein the zinc concentrate is ground to a median particle size of 1 to 100 $\mu$m and a 90% particle size of 50 to 1000 $\mu$m.

21. The method according to claim 1, wherein the free sulfuric acid has a concentration of 150 to 200 g/L.

22. The method according to claim 1, wherein the ferric ions in the aqueous solution are in a concentration of 2 to 15 g/L.

23. The method according to claim 9, wherein the pressurized oxidizing atmosphere is at a pressure of 0.7 to 1.0 MPa.

* * * * *